June 11, 1929.  W. A. LOOMIS  1,716,925
WELL CEMENTING METHOD AND MEANS.
Filed March 6, 1928
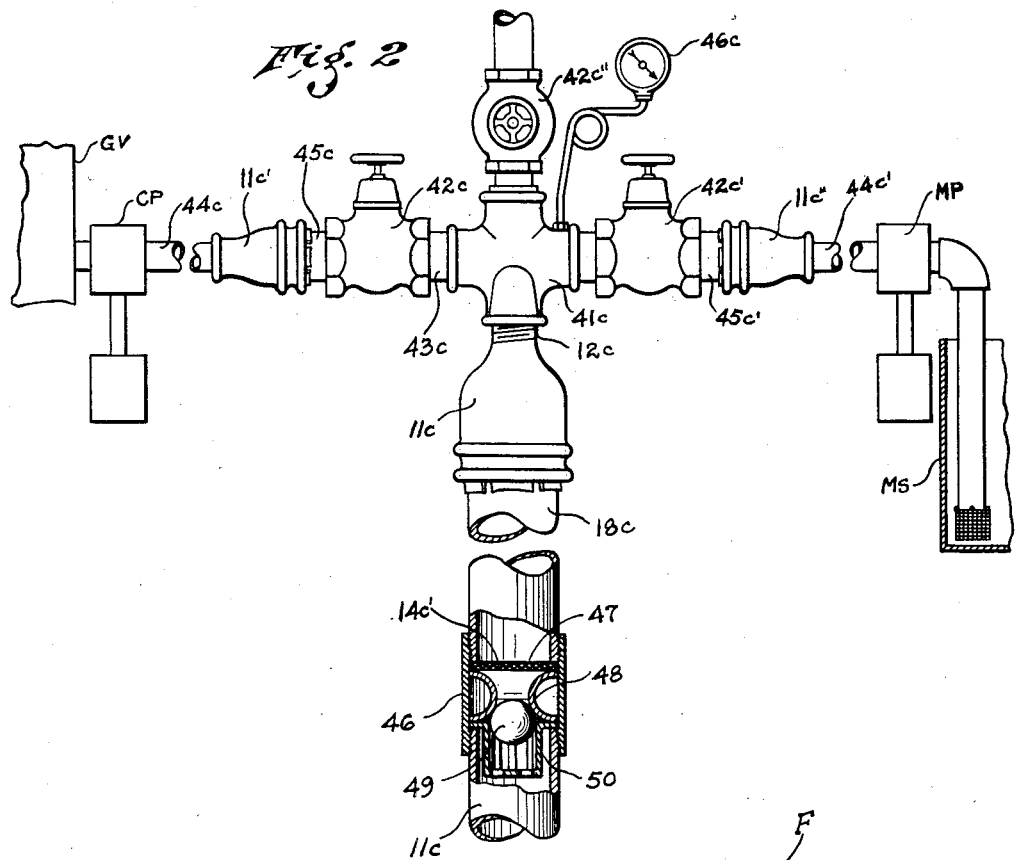
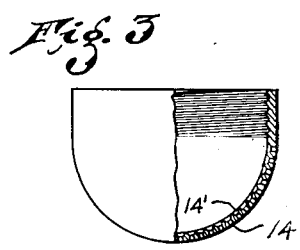
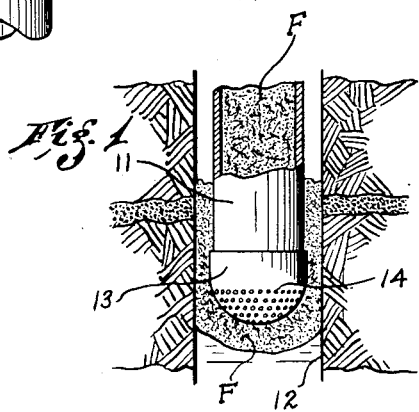
INVENTOR.
Walter A. Loomis.
BY Bert Russell
ATTORNEY.

Patented June 11, 1929.

1,716,925

UNITED STATES PATENT OFFICE.

WALTER A. LOOMIS, OF LONG BEACH, CALIFORNIA.

WELL-CEMENTING METHOD AND MEANS.

Application filed March 6, 1928. Serial No. 259,589.

Various methods and devices being currently employed to limit the downward delivery of a predetermined quantity of cement grout, as used (by an upward displacement of water, oil or mud) in the exclusion of water from oil wells, or for like purposes, it is a primary object of this invention materially to simplify the apparatus and the technique of operations of the general character referred to; and, so far as concerns the apparatus required for the practice of this invention, although it may be embodied in various special organizations such as are hereinafter suggested, my novel method can be practiced by the use of apparatus differing from certain types heretofore in use only, or mainly, in the replacement of an ordinary single-opening "shoe", at the lower end of a cement delivery string, by a shoe provided with numerous small openings,—so small as to be readily obstructed by fibrous or similar material that can be embodied in and carried downward with a final batch or fraction of the cement grout, or its equivalent.

As above intimated, instead of inserting a ball valve element, a piece of board or another partitioning element, or a "spacer" of any description, above or below or within a body of cement delivered into a string of pipe extending down to the level at or near which a cementing job is to be done, it is an object of this invention to effect a retardation or stoppage, or to obtain notice of the delivery of a body of cement at the desired level and in desired quantity, to effect a shutting off of water, or the like (without danger of mixing therewith any appreciable quantity of the "mud" that may be used in forcing the cement to position) by introducing into a batch or fraction of the cement grout, and presumably into only the last batch or fraction, a fibrous or other clogging material such as, for example, cottonseed hulls or wood fibre or other materials hereinafter suggested,—this added material being effective automatically to close the relatively numerous and comparatively small openings in a baffle, a shoe, or the like, at or near the lower end of the delivery string, and thereby to check or stop the action of a mud or slush pump, and/or to produce a marked rise in the pressure within the mentioned pipe. The laboring or stopping of the pump, or the indication given by a pressure gauge, may thus give notice that the body of cement, or a desired portion thereof, has reached its intended position of use, a sufficient fraction of the grout or grout and fibre mixture being then still left in the delivery string to obviate risk of contamination of the cement with the mud or slush employed to force the same downward.

It being now common to provide such strings of pipe as are employed in the downward delivery of cement with downwardly-opening float valves, retained within cages and adapted to prevent undesired upward entrance of fluid during the lowering of a string of pipe to a desired depth, in preparation for a cementing job, it is a further object of my invention, in one embodiment thereof (in which one or more lengths of pipe may be provided below the mentioned float valve) to provide a novel combination including, in addition to said float valve, and preferably in combination with a seat or a cage therefor, a small-apertured or reticulated element serving, in the indicated general manner, to obstruct the passage of any fibrous or similar material incorporated in a final batch or fraction of the cement grout introduced thereabove, and thereby automatically to produce the checking and/or warning effects above mentioned.

If desired, I may conjointly use a special float valve organization, provided with a foraminous partition of the described character, and a special terminal shoe, also provided with comparatively small openings; but my invention should be understood to include not merely the specifically mentioned special valve organizations and the mentioned special shoes (and combinations thereof) but, more particularly, the very simple and effective methods of operation in which the mechanical device referred to, or equivalent devices differing therefrom in details of construction, may be employed.

Other objects of my invention may be best appreciated from the following description of illustrative embodiments thereof, taken in connection with the appended claims and the accompanying drawing. in which Fig. 1 is an elevation showing a special shoe suitable for use in the practice of this invention, in one of the simplest embodiments thereof.

Fig. 2 is a diagrammatic view showing, mainly in elevation and with parts broken away, another form of apparatus suitable for use in the practice of this invention.

Fig. 3 is an enlarged vertical half section of a special shoe such as is shown in Fig. 1, sufficient detail being drawn in to indicate one advantageous type of reticulation or aperturing.

Referring to the details of that embodiment of my invention shown in Fig. 1, 11 being the lowermost section of a string of pipe intended for the downward delivery of a batch of cement grout into a well hole 12, I show a transverse reticulum, in the form of a special shoe 13, at the lower end thereof,—this shoe being provided with numerous small openings 14. These openings are intended to be collectively of sufficient total diameter to permit a satisfactory delivery of cement grout therethrough, although individually so small as to be easily closed by a suitable fibrous or other clogging material,— such as, for example, wood fibre, small wood shavings, leather shavings, cottonseed hulls, hemp or cotton waste, suitably comminuted rags or tough paper, low grade asbestos, "puffed wheat," or the like.

In the use of a shoe of the described character, a quantity of cement appropriate to the requirements of a given job being first delivered into the pipe 11, at or near the upper end thereof, instead of inserting any so-called float or spacer or valve element of known or special type within or above the mentioned body of cement, I may dry-mix with a late or final batch or fraction thereof (as, with the last two or three bags of cement) a substantial quantity (say, 10% to 50% by volume) of a suitable fibrous material F,—sufficiently fine to pass thru the cement pump but sufficiently coarse to assure a reasonably prompt clogging of the mentioned openings 14, when these shall be encountered by the fibrous material F.

In its relation to setting, hardness and imperviousness, the clogging material referred to is preferably of an inert and harmless character, so that the exit of a part thereof thru the openings 14 may be of no consequence; but the volume of the fibre-containing final batch or fraction is intended to be such, or to be followed by enough grout, in this embodiment, to assure the retention of a considerable part thereof within the lowermost pipe section 11. Thus practically none of the "mud" or liquid that may be employed to force the cement grout downward in a known manner, can pass, either as such or in admixture with the cement, out thru the shoe 13, or its equivalent.

For purposes of comparison, I may call attention to a recently granted patent to Huber, No. 1,647,003, which discloses the use of a single central opening in a "shoe," or in a so-called terminal protector, this being so constructed as to provide a seat for a ball of other valve element; but such a valve element requires to be carefully adapted, in respect to its specific gravity, to remain in the downwardly-advancing plane between the cement grout and the subsequently introduced "mud;" and Huber describes the introduction of the mentioned valve, in the form of a ball, as involving a removal and replacement of a cap. This obviously implies risk of an admission of air, by reason of an unbalance of pressures; and it is an important advantage of my described method that the finely subdivided fibrous material, or its equivalent, can be introduced thru the cement pump, without involving the removal of any cap, and can be carried downward wholly or largely at a considerable distance from the upper surface of the grout mixture,—so that there need be no danger that any "mud" shall pass thru my novel shoe, or its equivalent.

However, it should be understood that a fine-apertured or reticulated element, adapted to become clogged by the fibrous material admixed with a late or final batch of cement, may be at the extreme end of a pipe string, as illustrated in Fig. 1, or at any desired distance (say, at a distance corresponding to the length of one section of pipe) from the lower end of the string thru which cement is downwardly delivered; and, in connection with my illustration of this alternative, in Fig. 2, I incidentally show the use of a downwardly-opening float valve and also the use of so-called safety tubing gates. The latter may be such as are described and claimed in my copending application Ser. No. 214,869; filed August 23, 1927, and already so well known as to require little description herein.

That is to say, I show, in the upper portion of Fig. 2, an above-ground organization which comprises a "bell" 11$^c$ and a cross 41$^c$, the latter being connected with valves 42$^c$, and 42$^{c\prime}$ and 42$^{c\prime\prime}$ by means of nipples 42$^c$, and I may therein use additional and smaller "bells" 11$^{c\prime}$ and 11$^{c\prime\prime}$, in connection with a pipe 44$^c$ (leading from a cement pump CP, connected with a grout vat GV) and with a pipe 44$^{c\prime}$ (leading from a mud pump MP, connected with a mud vat or sump MS). The "bells" 11$^c$ and 11$^{c\prime\prime}$ may be respectively connected to nipples 45$^c$ and 45$^{c\prime}$, and the valve 42$^{c\prime\prime}$ may be employed as a "pressure bleeder" or control, or for any other desired use; but the quick-detachable features of the above-ground organization here referred to are comparatively immaterial to my present invention.

Assuming the parts last described, or equivalent parts, to be assembled above a pipe 18$^c$, thru which cement is to be downwardly delivered, instead of merely equipping the lowermost section of the pipe 18$^c$ (or the pipe 11 of Fig. 1) with a mere reticulated or small-apertured shoe, using an ordinary or special coupling 46, I may, as an alternative or as an extra precaution, interpose within a slightly more complicated below-ground organization, a suitably-apertured or reticulated plate 47, placing the same immediately above or within one of the lowermost sections of pipe; and/or I may associate this plate, or its equivalent, with a seat 48, suitable for engagement by a ball or other downwardly-opening or float valve element 49,—this valve being used, in a known manner, for the purpose of so restricting or preventing the upward admission of liquid as to facilitate the manipulation of the string of pipe 18ᶜ, by creating such a buoyancy as to take a part of the weight of said string off from any supporting means by which the same may be lowered and/or held.

I show the ball 49 as confined within a cage 50, projecting downward into a low or final section of pipe (which obviously may carry an ordinary shoe or a special shoe 13) and as disposed below a reticulum in the form of a plate 47; but it should be understood that, although two of the mentioned foraminous elements may be concurrently employed, any one such element (as, the easily-inserted plate 47 or the terminal shoe 13) may ordinarily be sufficient; and all of the special interior or terminal members referred to may be advantageously formed of a cast or other friable metal, to permit the same easily to be broken up during drilling operations conducted subsequently to a cementing job executed in the described manner.

Using any of the described foraminous interposed elements or equivalent elements provided with numerous apertures such as to permit an ordinary cement grout to pass but so small as to be clogged by a suitable fibrous material, or the like, whenever approximately the required amount of cement grout has been pumped into the pipe 11 or the pipe 18ᶜ, the cement pump CP being either interrupted or continued in operation, a fibre-containing batch of cement grout or mixture (which may involve the use of, say, three bags of cement to one bag of suitable fine shavings, or the like, thoroughly admixed, and optionally followed by a similar small batch of cement unmixed with fibrous material) may be similarly advanced before the pump CP is permanently stopped. The valve 42ᶜ may be then closed, the valve 42ᶜ′ opened, and the mud pump MP started, the latter being permitted to continue in operation until it begins to labor or is automatically stopped (or until the gauge 46ᶜ shall show a sudden increase in pressure) by reason of the clogging of the openings 14, and/or 14ᶜ. The valve 42ᶜ′ being then closed, operations may be discontinued during a period sufficient to permit the cement, as forced outward thru the described openings and compelled to rise about the pipe 11 (or 11ᶜ and/or 18ᶜ) to set and partially harden.

Even before satisfactory setting is assured, an opening of the valve 42ᶜ′′, or its equivalent, may so relieve the inner pressure as to enable the described above-ground parts to be quickly disconnected, for use elsewhere,— the valve 49 being effective to resist any unbalanced upward pressure.

Although I may form the mentioned transverse elements containing numerous small openings in any desired manner, optionally employing a reticulum of woven strands of steel wire, or the like, it may ordinarily be desirable to accelerate and/or assure the desired action of any introduced clogging material by providing for an outward diminution in the diameter of the mentioned numerous small openings; and, for this purpose, I may, as suggested in Fig. 3, internally terminate the respective openings 14 (which may be about $\frac{5}{16}''$ in diameter, in case fine shavings or the like are to be used in a final or late batch of cement mixture) in interior conical enlargements 14′,—such, for example, as can be provided by countersink drilling operations. The operations last referred to may be such as practically to cover an entire hemispherical or other interior area thru which extend the holes 14; and it will be obvious that as soon as any of the holes 14 (or 14ᶜ) become clogged, the diversion of the flow to the remaining holes must accelerate the delivery of fibrous material thereto and the consequent clogging thereof.

Although I have herein described a single complete embodiment of my invention, suggesting various alternative details, it should be understood not only that any ordinary above-ground equipment may be employed in the downward delivery of the cement grout and the fibre-containing grout mixture, in the general manner described, but also that various feature of this invention might be independently employed and that numerous modifications, additional to those herein suggested, might easily be devised by workers skilled in the arts to which this case relates,—all without involving the slightest departure from the spirit and scope of said invention, as the same is indicated above and in the following claims.

I claim as my invention:

1. A method of cementing wells which includes: providing an interposed element with numerous small openings near the lower end of a conduit for the downward delivery of cement mixture; advancing a predetermined quantity of cement grout therethru under fluid pressure; and limiting the advance of said grout when said grout reaches a predetermined position, by clogging said openings.

2. A method of cementing wells which includes: providing an interposed element with numerous small openings near the lower end of a conduit for the delivery of cement mixture; advancing a predetermined quantity of cement grout therethru under fluid pressure; and limiting the advance of said grout, as said grout reaches a predetermined position, by clogging said openings,—said clogging being effected by the engagement of said opening by a suitably subdivided clogging material incorporated in a fraction of said cement mixture.

3. A method of hydraulically delivering, through a conduit having an inlet and outlet, a predetermined main quantity of cement mixture which consists in: providing, near the outlet end of said conduit, a foraminous member whose openings are of such size as to become clogged by finely subdivided inert material of a suitable size; incorporating such material with a late portion of the cement mixture introduced into said conduit; and applying hydraulic pressure to advance said late portion, and thereby said main quantity of cement mixture, until said openings become appreciably clogged.

4. In the placing of a body of cement grout at a desired level relatively to small openings provided near the outlet end of a conduit through which said grout is forced by a pressure fluid, a method which comprises: incorporating in a late batch of said cement grout, introduced in advance of said pressure fluid, a subdivided material adapted to so clog said small openings as substantially to prevent advance of said pressure fluid therethrough.

In witness whereof, I have hereunto affixed my signature.

WALTER A. LOOMIS.